US007970582B2

(12) United States Patent
Grühn et al.

(10) Patent No.: US 7,970,582 B2

(45) Date of Patent: Jun. 28, 2011

(54) DIAGNOSIS SYSTEM FOR AT LEAST ONE TECHNICAL SYSTEM

(75) Inventors: Michael Grühn, Erlangen (DE); Ulrich Kunze, Bubenreuth (DE); Norbert Schiller, Lauf (DE)

(73) Assignee: Siemens Aktiengesellschaft, Munich (DE)

(*) Notice: Subject to any disclaimer, the term of this patent is extended or adjusted under 35 U.S.C. 154(b) by 994 days.

(21) Appl. No.: 10/501,725

(22) PCT Filed: Feb. 24, 2003

(86) PCT No.: PCT/EP03/01864

§ 371 (c)(1), (2), (4) Date: Jul. 15, 2004

(87) PCT Pub. No.: WO03/077047

PCT Pub. Date: Sep. 18, 2003

(65) Prior Publication Data

US 2005/0144264 A1 Jun. 30, 2005

(30) Foreign Application Priority Data

Mar. 8, 2002 (EP) .................................... 02005438

(51) Int. Cl.
*G06F 11/30* (2006.01)

(52) U.S. Cl. ...................................................... 702/183

(58) Field of Classification Search .................... 702/32, 702/80, 104, 116, 117, 119–123, 141, 188, 702/189, 182–186; 370/242, 312, 224; 709/224, 27, 223; 714/27, 223

See application file for complete search history.

(56) References Cited

U.S. PATENT DOCUMENTS

| | | | | |
|---|---|---|---|---|
| 6,298,308 | B1 * | 10/2001 | Reid et al. | 702/56 |
| 6,298,377 | B1 * | 10/2001 | Hartikainen et al. | 709/223 |
| 6,357,017 | B1 * | 3/2002 | Bereiter et al. | 714/27 |
| 6,553,336 | B1 * | 4/2003 | Johnson et al. | 702/188 |
| 6,633,833 | B2 * | 10/2003 | Sharma et al. | 702/188 |
| 6,735,630 | B1 * | 5/2004 | Gelvin et al. | 709/224 |
| 6,819,655 | B1 * | 11/2004 | Gregson | 370/242 |
| 6,842,433 | B2 * | 1/2005 | West et al. | 370/312 |
| 6,892,317 | B1 * | 5/2005 | Sampath et al. | 714/4 |
| 7,065,471 | B2 * | 6/2006 | Gotoh et al. | 702/183 |
| 2003/0083838 | A1 * | 5/2003 | Barrett et al. | 702/117 |

FOREIGN PATENT DOCUMENTS

| | | | |
|---|---|---|---|
| EP | 0 965 897 | A1 | 12/1999 |
| WO | WO 01/95041 | A1 | 12/2001 |
| WO | WO 01/97362 | A2 | 12/2001 |
| WO | WO 01/98849 | A2 | 12/2001 |

* cited by examiner

*Primary Examiner* — Mohamed Charioui

(57) ABSTRACT

The invention relates to a diagnosis system comprising a detection unit for detecting measuring data, a storage unit for storing measuring data, a diagnosis unit for classifying the operational states of the technical system and at least one server unit which is at least connected to the storage unit and machine-readable data based on the HTML-language is produced. The system enables diagnosis data of a technical system to be transmitted in a simple manner in the form of dynamic HTML pages, especially via the internet and to be evaluated.

4 Claims, 2 Drawing Sheets

5 Power Station
MD
17 Acquisition Unit
20 Memory Unit
21 Server Unit
25 Diagnostics Unit
I Internet
1
B Client Computer 15

DIAGNOSIS SYSTEM FOR AT LEAST ONE TECHNICAL SYSTEM

CROSS REFERENCE TO RELATED APPLICATIONS

This application is the U.S. National Stage of International Application No. PCT/EP03/01864, filed Feb. 24, 2003 and claims the benefit thereof. The International Application claims the benefits of European Patent application No. 02005438.3 EP filed Mar. 8, 2002, both of the applications are incorporated by reference herein in their entirety.

FIELD OF THE INVENTION

The invention relates to a diagnostics system for a technical installation, in particular for a power station.

BACKGROUND OF THE INVENTION

During operation of a technical installation, as a result of the changing operating conditions over time, a series of operating states arise that must be checked as to whether they are varying within acceptable tolerances and hence are to be classified under normal operation, or whether operating states are occurring, not least occasionally, that put at risk the operation of the installation and/or the operating staff and/or the environment.

Thus is it necessary, in particular in a power station, that at least in the event of doubt the relevant operating states of the installation are assessed by an expert so that countermeasures can be taken in good time should there be an unacceptable and/or unwanted operating state. The expert advice must be available quickly, since it may determine how the power station is subsequently operated and any risk needs to be ruled out. Thus a short response time to any unacceptable and/or unwanted operating states of the technical installation that arise is essential, because this affects operational reliability and safety in the broadest sense and/or the costs of operating the technical installation.

In order to assess the operating state of a technical installation, in particular a power station, evaluation information in the form of operating data is investigated using suitable means, for example by means of analysis tools created for the purpose that can be used to draw conclusions from the operating data as to whether and/or when and/or to what extent intervention in the operation of the technical installation is necessary. For example, characteristic values representing certain operating states and varying within certain limits for normal operation can be derived from the operating data for this purpose. Using the quantity of the characteristic value concerned, an expert can then draw conclusions as to possible operating states that in particular vary outside an acceptable operating range of the technical installation and hence require a response.

At present, in order to collate and analyze the information, an expert entrusted with the assessment of the operating state of a technical installation must either go physically to the technical installation or establish a connection to the technical installation, for example via a remote data communications link, in order to obtain the information required.

The expert receives the operating data needed for assessing the operating state from the technical installation itself and/or from a database of the technical installation control system; however, the tools, in particular software tools, needed for determining the characteristic values, for example, must be available at the point where the expert is located, for example by being installed directly in the technical installation, by being brought there with him or by being installed on the computer from which the expert has established remote data communications with the technical installation.

"Remote expert centers" are also known in some cases, in which the infrastructure needed by experts, in particular computer and software support tools, is available for performing a diagnosis of operating states of technical installations. Remote data communications can be established from this remote expert center to generally a plurality of technical installations, so that extensive diagnostics systems do not need to be installed in each of the technical installations. Nevertheless, at least one suitable expert must be in the remote expert center to produce a diagnosis, because the necessary support tools are only available there. Keeping experts and/or expert knowledge in such a center inevitably has the disadvantage of high costs however.

SUMMARY OF THE INVENTION

The object of the invention is thus to specify a diagnostics system for at least one technical installation that is simple to implement and install, does not result in high installation costs and is versatile to use.

In particular, it shall be possible to perform a diagnosis of one or more technical installations from almost anywhere in the world.

The object is achieved according to the invention by a diagnostics system for at least one technical installation comprising the following components:

at least one acquisition unit for collecting measurement data occurring in at least one of the technical installations and detected there by sensors.

at least one memory unit that is connected to the acquisition unit and by means of which the measurement data can be stored, at least one diagnostics unit, connected at least to the memory unit, for classification of current and/or past and/or expected operating states of the technical installation that are represented by the measurement data, and at least one server unit, connected at least to the memory unit, by means of which machine-readable data based on the HTML language can be generated.

The invention is here based on the consideration that a diagnostics system can be particularly versatile to use when the data that it collects and determines relating to one or more technical installations can be retrieved from almost anywhere in the world so that an expert entrusted with the assessment of operating states of a technical installation is not tied to a location and in particular need not be located at the site of the technical installation. Since the measurement data occurring in a technical installation is dynamic data that may also change rapidly and vary widely over time, it is necessary to provide in a diagnostics system according to the invention the facility to prepare dynamic data containing the measurement data from the technical installation in such a way that it can be retrieved in a simple manner in as many places as possible from almost any distance.

In the diagnostics system according to the invention this is achieved by the measurement data collected by the acquisition unit and stored in the memory unit, and the additional diagnostic data relating to the technical installation determined by the diagnostics unit, being processed by the server unit into what is known as dynamic HTML pages that can be transferred and retrieved simply via an intranet and/or the Internet.

Unlike most known Internet pages, which contain mostly static data and hence are stored and retrieved as static HTML pages, in the diagnostics system according to the invention it is provided that the measurement data and/or additional diagnostic data of a technical installation retrieved by an expert for instance is not processed into one or more HTML pages until the time of the data retrieval; this important core information relating to the technical installation is therefore not processed into at least one HTML page until the time of the data retrieval, for example via the Internet.

The machine-readable data based on the HTML language therefore includes Internet pages that are not generated by the server unit until the moment at which access is made to the server unit, for example by a Web browser.

Such dynamic HTML pages can be generated by the following techniques for example:

Server-Side Scripting:

The HTML page is saved with a script code as a file in a memory of the server unit. Before this file is transferred via the Internet by the server unit, a special software program replaces the script code with dynamically generated standard HTML. The final content of a retrieved HTML page containing measurement data and/or additional diagnostic data or even other data from the technical installation is therefore not generated until the time at which the data is retrieved from the server unit.

CGI Programming:

In this technique, the retrieved HTML page is generated entirely by CGI programs. This programming is well-known and has the advantage, for example, that no special script language needs to be learnt to write a CGI program.

Thus when CGI programming is used, a suitable CGI program generates at the time of access, for example by a client to the server unit via the Internet, an HTML page containing, for example, current measurement data from a technical installation, and this HTML page is then transferred by means of the server unit via the Internet.

It is advantageous if at least parts of the machine-readable data are generated at a time at which a connection to the server unit of the diagnostics system is established by at least one client computer via a communications link by means of an Internet browser installed on the client computer, and the parts of the machine-readable data are requested by the client computer.

In this embodiment of the invention it is provided that at least part of the machine-readable data generated by the server unit is not saved in advance and simply transferred during a retrieval, but that these parts are generated dynamically only at the time of a data retrieval from the server unit, for example by means of a client computer. In particular, this may be data from the technical installation that typically varies over time, such as the measurement data detected in the technical installation and data generated on the basis of this measurement data, for example the additional diagnostic data derived from the measurement data by the diagnostics unit. In particular, it is useful if the measurement data and the technical installation data derived from this are generated in the form of HTML pages only at the time of the data retrieval, because, owing to the dynamic nature of this information relating to the technical installation, its content is not fixed in advance.

Other, in particular general information from the technical installation such as static top-level images, photos, descriptions etc. can be converted in advance into static HTML pages or static sections of HTML pages, and simply retrieved from the memory at the time of the data retrieval and transferred, possibly with the addition of dynamic data, as one or more dynamic HTML pages.

It is particularly advantageous if the machine-readable data is transferred from the server unit to the client computer by means of the TCP/IP protocol via the communications link, which in particular includes an intranet and/or the Internet.

In this embodiment of the invention, the TCP/IP protocol, which is highly standardized and widely established in conjunction with Internet applications, is used for transferring the retrieved data via the communications link. Thus it is not necessary to provide a dedicated data-transfer mechanism for transferring the requested data; the well-known TCP/IP protocol is employed, which can be used without making any special provisions, and is already available on a large number of computers with Internet access.

In a further advantageous embodiment of the invention, a dynamic operating and/or monitoring interface of the diagnostics system is formed by means of the machine-readable data.

In this embodiment of the invention, no special software needs to be installed on a computer retrieving data from the server unit, for example the client computer, in order to be able to read and process the data retrieved from the server unit.

The machine-readable data based on the HTML language generated by the server unit also includes in this case the graphical information that enables a user retrieving data from the server unit via the Internet, for example, to display and process further the retrieved data on his computer. This may be a process diagram of the technical installation, for instance, in which [are displayed] the current values of measurement data and of additional data derived from the measurement data such as additional diagnostic data. In addition, apart from displaying data from the technical installation, control functions can also be included in the machine-readable data, for example means with which the user can selectively request from the diagnostics unit of the diagnostics system say, additional data not (yet) displayed. The diagnostics unit can also include software tools for example that provide various options for analyzing the measurement data. For example, if a system expert recognizes after accessing the server unit of the diagnostics unit that a current operating state of the technical installation requires closer investigation, then by means of the (dynamic) operating and/or monitoring interface contained in the machine-readable data he can selectively perform further actions, for example execution of special analysis programs that are included in the software tools and enable detailed analyses of an operating state.

The machine-readable data advantageously contains HTML pages that are stored as pre-prepared, static data in a memory, in particular in the memory unit, of the diagnostics system and/or are generated dynamically by the server unit by combining a page generation code and at least part of the measurement data stored in the memory unit.

In this embodiment of the invention the data content of one or more HTML pages generated by the server unit is not entirely specified at the time of a data access to the server unit.

Usually at least some of the information relating to the technical installation that is transferred by the server unit during access is of a static nature, so is not subject to any changes during operation of the technical installation, for example a top-level diagram of the technical installation components and their interconnections. This static data can also contain photos of the technical installation or of system components, operating manuals or the like. Generation of such data need not wait until the time of a data access, but can be generated and saved in advance as HTML pages. Dynamic data, on the other hand, such as current values of measurement data and/or data derived from the measurement data such as additional diagnostic data from the technical installation cannot be stored in advance, because it is not available until the technical installation is operating and is often subject to strong variations.

Static and dynamic data is combined by means of the page generation code, which is running on the server unit at the time of a data access to the server unit, and combines the static and dynamic data into a dynamic HTML page. This embodiment of the invention avoids the need for programs that use large amounts of processing time to run at the time of the data retrieval in order to generate a dynamic HTML page in full: only the dynamic component of the dynamic HTML page is freshly generated.

In another advantageous embodiment of the invention, the diagnostics system is designed for a plurality of technical installations and contains precisely one memory unit, in which the measurement data occurring in each of the technical installations is stored centrally.

In this advantageous embodiment of the invention, the precisely one memory unit assumes the role of a central database in which the measurement data from all the power stations is archived. This measurement data can be saved in this central database regularly and/or on request. Here the precisely one memory unit is advantageously equipped with a Web server so that the data stored in this central database can be retrieved in a simple manner via the Internet from any location having Internet access. The data-analysis software tools already cited in connection with other embodiments of the invention can also be stored on computers having Internet access, so that measurement data from the technical installation stored in the central database can be transferred via the Internet to the computers on which the aforementioned software tools are installed. A virtual diagnostics laboratory that is not tied to any location and can be used from any location with Internet access is created in this way. The software tools can request via the Internet each item of input data that it needs from the central database, and write the results and conclusions that are found by them back into the database. The retrieval and the execution of these software tools can be performed automatically, for example, and/or by requesting a corresponding Internet page, where this Internet page can be configured in such a way that it already contains the required/requested results once it is opened. The mechanism for creating such a dynamic Internet page can be implemented, for example, by methods that were presented above in connection with the generation of Internet pages by the server unit of the diagnostics system according to the invention.

An expert who wishes to analyze the measurement data from one or more technical installation therefore essentially needs just a computer having an installed known Internet browser and access to an intranet and/or the Internet. Using this he can retrieve all the data he requires, for example from the central database of the aforementioned embodiment, perform special analyses using the software tools cited by way of example, and thus carry out an analysis requested by him of an operating state of one or more technical installations.

The main advantages of the diagnostics system according to the invention lie in particular in the fast access to the measurement data and additional diagnostic data from technical installations and to the said software tools, where access is practically independent of where the expert is located. In addition, the expert does not need any special software or hardware to produce an analysis.

Thus using a diagnostics system according to the invention, a virtual diagnostics laboratory can be created in a simple manner, where the measurement data from a number of technical installations can be stored in a central database—allowing easy implementation of redundant storage—where the measurement data from different technical installations can be compared with each other in a simple manner, where the software tools can be used for further refinement of the measurement data analysis, in particular offline, where teleservicing of the technical installations is implemented in a simple manner, where new diagnostic techniques can be tested easily on real measurement data, and where it is easy to upgrade the diagnostics system and/or the diagnostics units in the technical installations because a diagnostics system according to the invention preferably comprises a number of modules, each of which can be accessed selectively and each of which contain selectively designed interfaces for data transfer between themselves.

In addition, it should be mentioned that both the central database, which in a said advantageous embodiment of the invention contains precisely one memory unit, and the diagnostics units in the power stations can be operated from any computer that has access to an intranet/the Internet. The said software tools and the Web server contained in the central database are also advantageously Internet-compatible and can hence be controlled from almost any computer with Internet access.

BRIEF DESCRIPTION OF THE DRAWINGS

Two embodiments of the invention are presented in greater detail below.

DETAILED DESCRIPTION OF THE INVENTION

Figure 1:
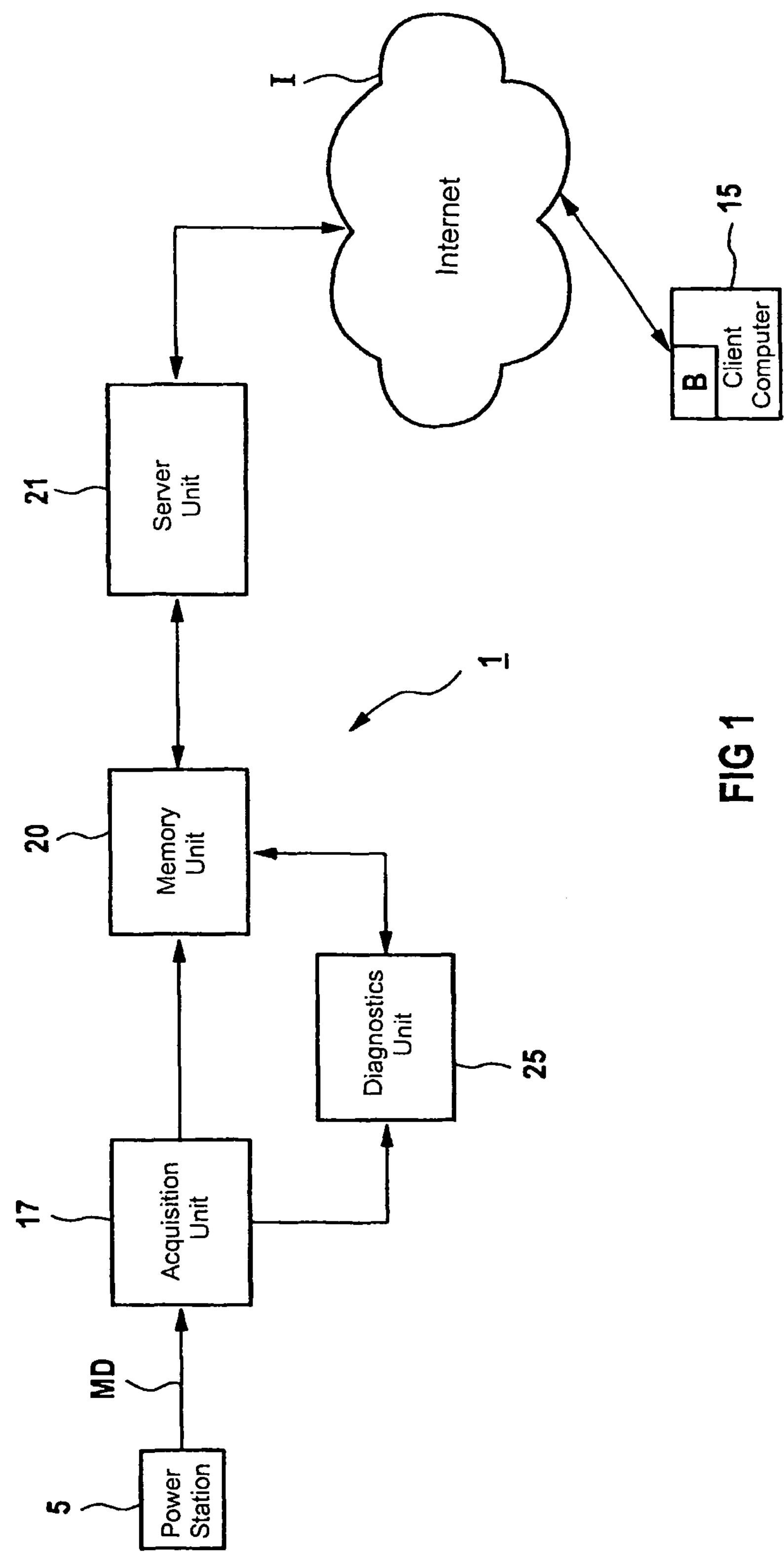
FIG. 1 shows a diagnostics system according to the invention, whose server unit is connected to the Internet.

FIG. 1 shows a diagnostics system 1 according to the invention that contains an acquisition unit 17 for collecting measurement data MD, a memory unit 20, a diagnostics unit 25 and a server unit 21.

Here the acquisition unit 17 receives the measurement data MD that occurs in the technical installation 5 and is detected there by sensors. The memory unit 20 is connected to the acquisition unit 17 so that the measurement data MD can be stored in the memory unit 20.

In order to be able to determine current, past and/or expected operating states of the technical installation 5 from the measurement data MD, in the diagnostics system 1 according to the invention shown in FIG. 1, a diagnostics unit 25 is connected to the acquisition unit 17 and the memory unit 20. In this way, both current measurement data MD of the technical installation received by the acquisition unit 17, and historical measurement data from the technical installation 5 from further back in the past that is saved in the memory unit 20, can be processed for diagnostics purposes. Of course measurement data MD from the immediate past, i.e. current measurement data from the technical installation 5, can also be saved in the memory unit 20.

On the basis of this current and/or historical measurement data MD, which relates to a current and/or past operating state of the technical installation, classifications K of these operating states can be performed by means of the diagnostics unit

25, for example as to whether a current and/or past operating state of the technical installation 5 is varying within an acceptable tolerance band and hence is to be regarded as a normal operating state, or whether there is a current and/or past operating state of the technical installation 5 that is varying outside normal operation and hence requires closer investigation. In addition, expected future operating states of the technical installation can be extrapolated by means of the diagnostics unit 25 from current and historical measurement data MD from the technical installation 5, for example in the form of a prediction as to whether a certain measurement value of the technical installation is highly likely to rise or fall, or whether one expects that this measurement value will remain constant. Such trends in operating behavior that relate to the operation of the technical installation 5 are extremely important to ensuring the reliable and desired operation of the technical installation 5 in the immediate, near or even distant future.

In order to be able to analyze the measurement data MD, the diagnostics unit 25 can contain software tools with which statistical analyses, trend analyses or other evaluations can be performed for example. The software tools can also be installed in a separate module, e.g. on a separate computer.

The classification K of the operating states of the technical installation represented by the measurement data MD is intended to include all this, in particular the classification is meant to enable a conclusion to be drawn as to whether the measurement data MD on which the classification is based is to be classified under normal operation or deviates from normal operation. Suitable graphics facilities for displaying operating states can also be provided in the diagnostics unit 25 or in a separate module.

The diagnostics unit 25 transfers its evaluation results to the memory unit 20 connected to a server unit 21. The server unit 21 is enhanced to generate machine-readable data MC based on the HTML language, so that data saved in the memory unit 20 can be transferred via the Internet I in a simple manner.

A client computer 15, which has an Internet browser B can set up a connection via the Internet I to the server unit 21 of the diagnostics system 1 according to the invention by means of the Internet browser B, so that measurement data MD relating to operation of the technical installation, and additional diagnostic data determined from this data by the diagnostics system can be displayed on the client computer. Preferably the data transfer is performed by means of the TCP/IP protocol.

Since much of the data relating to the operation of the technical installation changes at various rates over time, at least that machine readable data MC, in particular HTML pages, that contains the aforesaid varying data, is not generated as an HTML page until the time at which the client computer 15 accesses the server unit 21 via the Internet I and retrieves data from the technical installation 5.

The generation of these dynamic HTML pages as they are known can be implemented, for example, by means of script code, which is converted into a standard HTML document at the time of access to the server unit, or by the methods of known CGI programming.

In addition, the machine readable data MC generated by the server unit 21 contains a dynamic operating and/or monitoring interface of the diagnostics system 1, so that there is no need for the client computer 15 to have any additional software programs apart from the Internet browser B in order to monitor the data supplied by the diagnostics system 1 and to control functions of the diagnostics system 1, which may include, for example, further analysis, such as a trend analysis, of the measurement data MD by means of the diagnostics unit 25.

Figure 2:
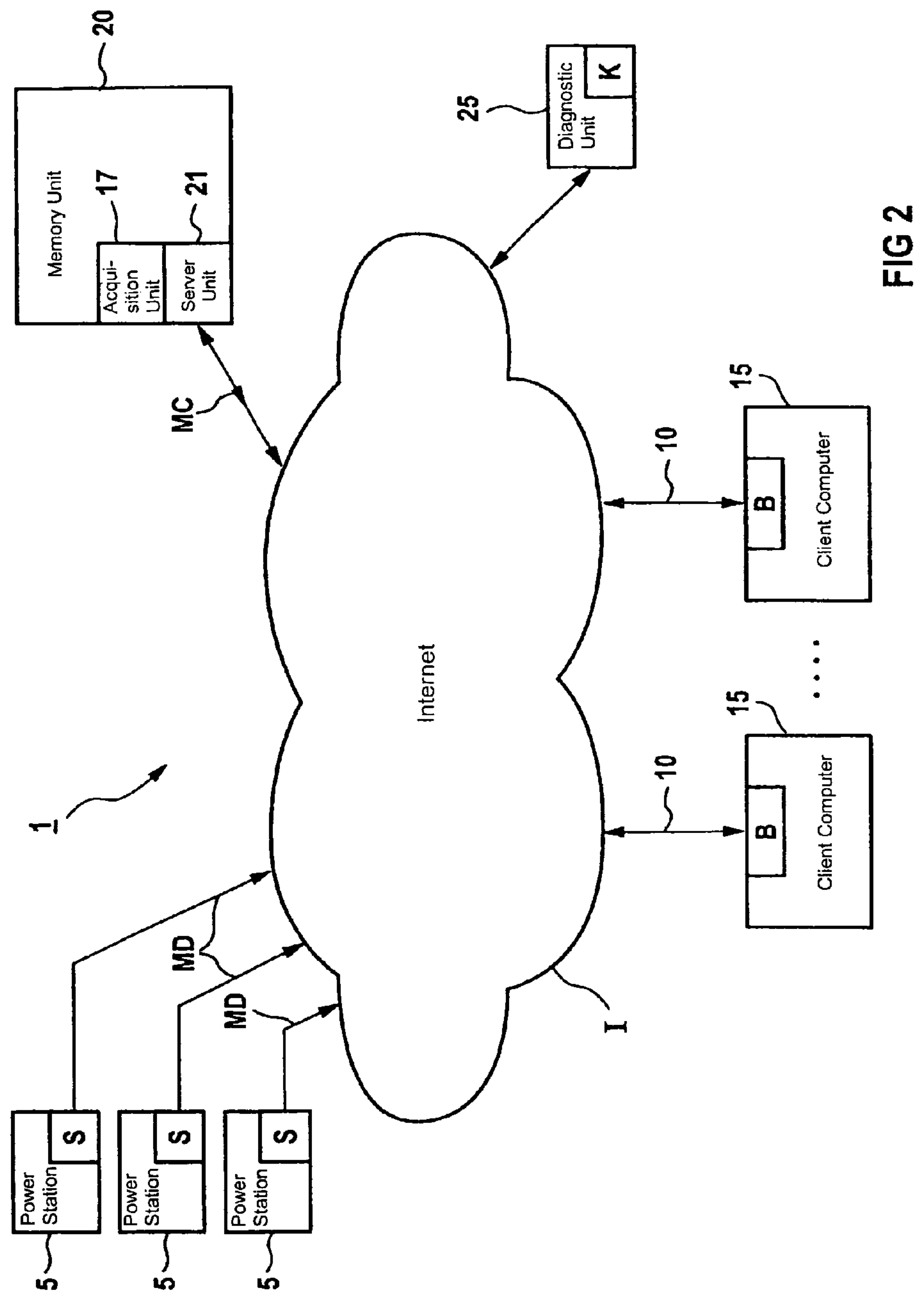
FIG. 2 shows a diagnostics system according to the invention for a plurality of technical installations, where the Internet assumes a central role in the data transfer between various sub-systems of the diagnostics system.

The diagnostics system 1 according to the invention shown in FIG. 2 is designed for the diagnosis of a number of technical installations 5.

In this case each of the technical installations 5 contain a server application S by means of which the measurement data MD collected in each of the technical installations can be transferred via the Internet I. This transfer can take place in the form of dynamically generated HTML pages for example.

A memory unit 20 is also connected to the Internet I and contains an acquisition unit 17 and a server unit 21. The acquisition unit 17 collects the measurement data MD from the technical installations transferred via the Internet I by the technical installations 5, so that this measurement data MD can be saved in the memory unit 20. This can happen either automatically, for example in fixed time intervals, or based on a selective retrieval of the measurement data MD, or on an event-driven basis where, for example, in particular measurement data MD from at least one of the technical installations 5 can be transferred to the memory unit 20 if there has been a change in the operating state of the technical installation 5 concerned. The data transfer from the technical installations 5 to the memory unit 20 can also happen in a mixed form of the mechanisms cited.

Machine readable data MC based on the HTML language can be generated by means of the server unit 21, so that data saved in the memory unit 20, in particular measurement data MD from the technical installation 5, can be transferred as HTML pages via the Internet I. The memory unit 20 is designed as a central database, so that the measurement data MD from a number of technical installations 5 can be stored in this central database 20.

A diagnostics unit 25 for classification K of the measurement data MD representing the operating states of the technical installation 5 is also connected to the Internet I. The diagnostics unit 25 advantageously contains a Web server for this purpose.

An expert who wishes to assess the operating state of one or more technical installations 5, can now set up a connection to the server unit 21 of the memory unit 20 via a communications link 10, which advantageously is part of the Internet, by means of the client computer 15 on which is installed an Internet browser B, and request data from there via the Internet I. Data transfer in this case is preferably performed by means of the TCP/IP protocol. The data saved in the central memory unit 20 can now be retrieved selectively by one or even a plurality of the client computers 15. This is done by transferring the requested data from the server unit 21 to the memory unit 20 via the Internet I to the client computer 15 concerned as machine readable data MC based on the HTML language, preferably as a dynamic HTML page that is generated by the server unit 21 at the time at which access to the server unit 21 of the memory unit 20 takes place from the client computer 15 concerned. It is also possible that only parts of the data to be transferred are generated dynamically at the time of the request by means of the server unit, and additional static data is retrieved from the memory and then combined with the dynamic parts of the data into a dynamic HTML page, in particular using a page generation code. This page generation code can be implemented in the server unit 21 and can contain a known script language.

FIG. 2 consequently shows a virtual diagnostics system that is not tied to any location, by means of which a number of technical installations 5 can be diagnosed from almost any location. Apart from simple retrieval of current and/or stored measurement data MD from the technical installation 5, it is also possible to process this data into additional diagnostic data by means of the diagnostics unit 25, which is also connected to the Internet from no fixed location. The results of such additional processing, which might include calculating trends, determining specific types of operating states, statistical analyses etc., can be transferred by the diagnostics unit 25 via the Internet I to the memory unit 20 and stored there, for example with the measurement data MD that has undergone additional evaluation, and retrieved at a later time, for example by one or more of the client computers 15.

The embodiment of FIG. 2 therefore offers a maximum degree of versatility for assessing operating states of technical installations 5, where in particular almost every restriction regarding the physical installation location of the monitoring, operating and/or analysis computers of the diagnostics system 1 is removed.

The invention claimed is:

1. A virtual diagnostics system configured to access and diagnose a plurality of remote stationary power stations, comprising:

a server at each power station for transferring collected measurement data via an internet;

a memory unit comprising an acquisition unit and a server unit receiving the collected measurement data via the internet from each power station server, and saving at least some of the collected measurement data;

a diagnostics unit comprising a server unit receiving the collected measurement data via the internet for classification of the measurement data; and a client computer comprising an internet browser and a communication link to the internet, and able to link to the memory server unit, wherein the measurement data saved in the memory unit can be retrieved by the client computer.

2. The virtual diagnostics system as claimed in claim 1, wherein the measurement data is transferred in the form of dynamically generated HTML pages.

3. The virtual diagnostics system as claimed in claim 1, wherein the measurement data from at least one of the power stations is transferred to the memory unit if there has been a change in an operating state of a power station concerned.

4. The virtual diagnostics system as claimed in claim 1, wherein machine readable data based on the HTML language is generated by the server unit so the measurement data saved in the memory unit can be transferred as HTML pages via the internet.

* * * * *